US008385538B2

(12) United States Patent
Qin et al.

(10) Patent No.: US 8,385,538 B2
(45) Date of Patent: Feb. 26, 2013

(54) METHOD, SYSTEM, AND APPARATUS FOR A DIFFERENTIAL TRANSFORMER-FREE HYBRID CIRCUIT

(75) Inventors: Laigui Qin, Sichuan (CN); Donald Edward Becker, Bradenton, FL (US); William Edwards, Bradenton, FL (US); Baohua Shu, Shanghai (CN); Wei Chen, Shanghai (CN)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 1112 days.

(21) Appl. No.: 12/332,178

(22) Filed: Dec. 10, 2008

(65) Prior Publication Data

US 2010/0142699 A1 Jun. 10, 2010

(51) Int. Cl.
*H04M 9/00* (2006.01)

(52) U.S. Cl. ......... 379/402; 379/345; 379/412; 333/117

(58) Field of Classification Search .................. 379/402, 379/405, 345, 412; 333/117
See application file for complete search history.

(56) References Cited

U.S. PATENT DOCUMENTS

| | | | | |
|---|---|---|---|---|
| 3,529,099 | A | 9/1970 | Ribner | |
| 4,041,252 | A * | 8/1977 | Cowden | 379/405 |
| 4,174,470 | A * | 11/1979 | Seidel | 379/405 |
| 4,181,824 | A | 1/1980 | Seidel | |
| 4,182,936 | A * | 1/1980 | Beirne et al. | 379/398 |
| 4,192,978 | A * | 3/1980 | Vincent | 379/405 |
| 4,228,323 | A | 10/1980 | Feiner et al. | |
| 4,278,847 | A * | 7/1981 | Wortman | 379/405 |
| 4,302,636 | A | 11/1981 | Dumont et al. | |
| 4,388,500 | A * | 6/1983 | Regan | 333/117 |
| 4,418,249 | A | 11/1983 | Birth | |
| 5,280,526 | A * | 1/1994 | Laturell | 379/405 |
| 5,602,912 | A | 2/1997 | Hershbarger | |
| 6,327,342 | B1 * | 12/2001 | Mobley et al. | 379/45 |
| 7,050,509 | B2 | 5/2006 | Krone et al. | |
| 7,050,574 | B1 | 5/2006 | Vareljian | |

FOREIGN PATENT DOCUMENTS

| | | | |
|---|---|---|---|
| EP | 0037518 | A1 | 10/1981 |
| WO | 03107212 | A1 | 12/2003 |

OTHER PUBLICATIONS

Patent Cooperation Treaty, International Preliminary Report on Patentability, Jun. 14, 2011, 6 pages.

* cited by examiner

*Primary Examiner* — Gerald Gauthier
*Assistant Examiner* — Simon King
(74) *Attorney, Agent, or Firm* — MH2 Technology Law Group, LLP

(57) ABSTRACT

A differential transformer-free hybrid circuit includes a first amplifier configured to receive a first signal from a transmitter and output the first signal to a telephone loop, and a second amplifier configured to receive a second signal from the telephone loop and output the second signal to a receiver. Further, the differential transformer-free hybrid circuit also includes at least one balanced network element and a transformer-less interface configured to couple the first amplifier and the second amplifier to the telephone loop, wherein the transformer-less interface includes at least one current blocking device.

14 Claims, 4 Drawing Sheets

METHOD, SYSTEM, AND APPARATUS FOR A DIFFERENTIAL TRANSFORMER-FREE HYBRID CIRCUIT

BACKGROUND OF THE INVENTION

1. Field of the Invention

The subject matter disclosed herein relates generally to communication over a telephone loop; and, more particularly, to a differential transformer-free hybrid circuit that eliminates the use of a transformer to interface the hybrid circuit to a telephone loop in a communications system.

2. Description of the Prior Art

A hybrid circuit is a circuit that converts between a bidirectional transmission on a single wire-pair and two unidirectional transmissions on two wire-pairs. A hybrid circuit used for transmission of audio receives audio signals from a telephone loop, outputs audio signals to a receiver wire-pair, and transmits audio signals onto the telephone loop that the circuit receives from a transmitter wire-pair. Because hybrid circuits interface with a telephone loop having an often unknown impedance, the hybrid circuits are designed for a wide range of line impedance levels. When one hybrid circuit transmits a signal over the telephone loop, the signal may face an impedance discontinuity due to a presence of an imperfect hybrid at an opposite end of the telephone loop, unknown line taps, or an unknown number of phones attached to the loop, for example. This impedance discontinuity creates signal reflections, which can leak into the incoming audio signal path and manifest themselves as audible echoes in the audio signal transmissions over the telephone loops because the hybrid circuit receives the signal reflection and unknowingly treats it as a part of the received signal. Echoes in audio communication are undesirable, even more so if the echoes are perceived by a user, which may occur if a round-trip delay of the echo exceeds a few tens of milliseconds and is unattenuated or only slightly attenuated.

Current technology hybrid circuits also require transformers to interface with the telephone loop. Transformer-based circuit constructs can be disadvantaged by these often bulky and expensive transformers. Use of transformers may result in limited frequency response of the overall telephone loop bi-directional transmissions, audible magnetic coupling noise from the transformers, and/or relatively large power consumption for short loops.

If an impedance of a telephone loop is controlled to within a certain range, or measured and/or modeled more accurately, hybrid circuits may be designed to more closely match the corresponding telephone loop impedance; thus, avoiding or minimizing echoes in the system.

Similarly, if a hybrid circuit can be created that eliminates the use of a transformer to interface with the telephone loop, the hybrid circuit may be created at a lower cost, lower weight, and/or may reduce, if not eliminate, problems associated with the use of a transformer in such a hybrid circuit.

FIG. 1 is a schematic diagram of a conventional telephone audio communication system 100 including a first hybrid circuit 104 and a second hybrid circuit 108. First hybrid circuit 104 receives an audio signal from a first transmitter (not shown) through a first amplifier 112 and transmits the audio signal over a telephone loop 116 to second hybrid circuit 108. Second hybrid circuit 108 receives the audio signal from telephone loop 116 and outputs the audio signal to a first receiver (not shown) using a second amplifier 120. Second hybrid circuit 108 also receives an audio signal from a second transmitter (not shown) through a third amplifier 124 and transmits the audio signal over telephone loop 116 to first hybrid circuit 104. First hybrid circuit 104 receives the audio signal from telephone loop 116 and outputs the audio signal to a second receiver using a fourth amplifier 128.

FIG. 2 is a partial schematic diagram of a hybrid circuit 200, such as first hybrid circuit 204 shown in FIG. 1. A first audio signal (not shown) is inputted to hybrid circuit 200 from the transmitter through a first operational amplifier 204, which outputs the amplified first audio signal to a first node 208. A voltage drop of the first audio signal is accomplished by a first balanced network element ($Z_1$) 212 electrically coupling first node 208 to second node 216, and a second balanced network element ($Z_2$) 224 electrically coupling second node 216 to ground. Similarly, a voltage drop of the first audio signal is accomplished across a third balanced network element ($Z_B$) 228 and a line transformer 232 with a transformer line impedance ($Z_L$) 236. The impedance ratio of first balanced network element 212 to second balanced network element 224, is approximately proportional to the impedance ratio of third balanced network element 228 to transformer line impedance 236 as to enable an approximately proportional voltage drop across each element. Hybrid circuit 200 provides for the amplified first audio signal to be output through line transformer 232. Hybrid circuit 200 also provides for a second audio signal (not shown) to be received from the telephone loop through line transformer 232 and output to the receiver through second operational amplifier 220. Analysis of hybrid circuit 200 reveals that it appears to null the echo only for the several typical cases where the telephone loop configuration is selected and simplified. To better provide for echo cancellation, a full set of loop configurations should be scanned and a worst case should be identified to enable a more robust echo cancellation circuit.

BRIEF DESCRIPTION OF THE INVENTION

In one aspect, a differential transformer-free hybrid circuit includes a first amplifier configured to receive a first signal from a transmitter and output the first signal to a telephone loop, and a second amplifier configured to receive a second signal from the telephone loop and output the second signal to a receiver. Further, the differential transformer-free hybrid circuit also includes at least one balanced network element and a transformer-less interface configured to couple the first amplifier and the second amplifier to the telephone loop, wherein the transformer-less interface includes at least one current blocking device.

In another aspect, a communications system includes at least one telephone device, and a telephone loop, wherein the telephone loop is coupled to the at least one telephone device. Further, the communications system also includes a differential transformer-free hybrid circuit coupled to the telephone loop, wherein the differential transformer-free hybrid circuit includes a first amplifier configured to receive a first signal from a transmitter and output the first signal to said telephone loop, a second amplifier configured to receive a second signal from said telephone loop and output the second signal to a receiver. In addition, the communications system includes at least one balanced network element, and a transformer-less interface configured to couple the first amplifier and the second amplifier to the telephone loop, wherein the transformer-less interface includes at least one current blocking device.

In yet another aspect, a method of facilitating communication over a telephone loop includes coupling at least one telephone device to a telephone loop. Further, the method includes coupling a differential transformer-free hybrid circuit to the telephone loop, wherein the differential transformer-free hybrid circuit includes a first amplifier configured to receive a first signal from a transmitter and output the first signal to the telephone loop, a second amplifier configured to receive a second signal from the telephone loop and output the second signal to a receiver, at least one balanced network element, and a transformer-less interface configured to couple the first amplifier and the second amplifier to the telephone loop, wherein the transformer-less interface comprising at least one current blocking device.

BRIEF DESCRIPTION OF THE DRAWINGS

FIG. 1 is a schematic diagram of a conventional, prior-art full-duplex audio transmission system with two hybrid circuits using a telephone loop.

FIG. 2 is a schematic diagram of a conventional, prior-art operational amplifier based hybrid circuit.

FIG. 3 is a schematic diagram of an exemplary differential transformer-free hybrid circuit.

FIG. 4 is a schematic diagram of an exemplary communications system using a differential transformer-free hybrid circuit.

FIGS. 5-9 are schematic diagrams of various exemplary balanced network circuits usable in a differential transformer-free hybrid circuit such as shown in FIG. 3.

FIG. 10 is a flowchart of an exemplary method of facilitating communication over a telephone loop using a differential transformer-free hybrid circuit.

DETAILED DESCRIPTION OF THE INVENTION

Figure 1:
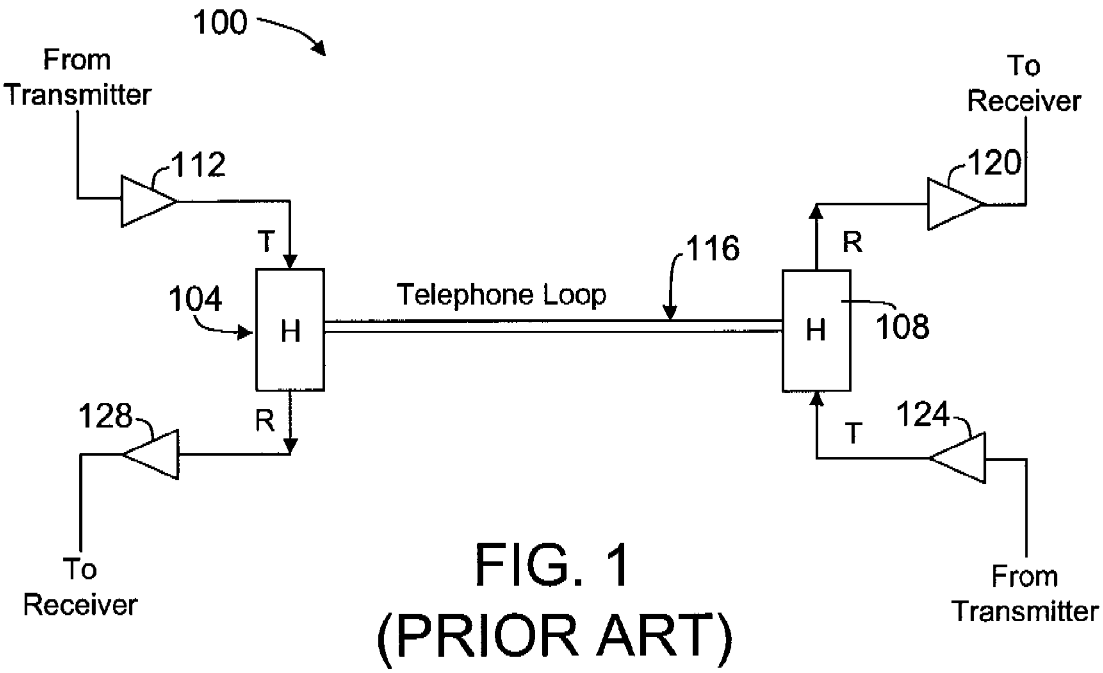
FIGS. 1-10 show exemplary embodiments of the apparatus, system, and method described herein. The embodiments shown in FIGS. 1-10 and described by reference to FIGS. 1-10 are exemplary only.
Figure 2:
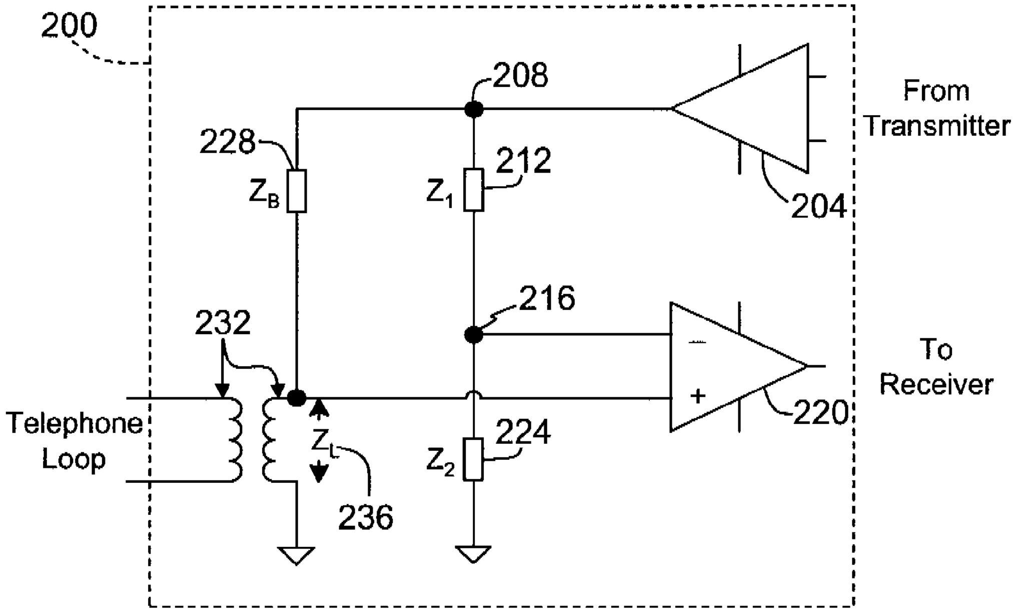
Figure 3:
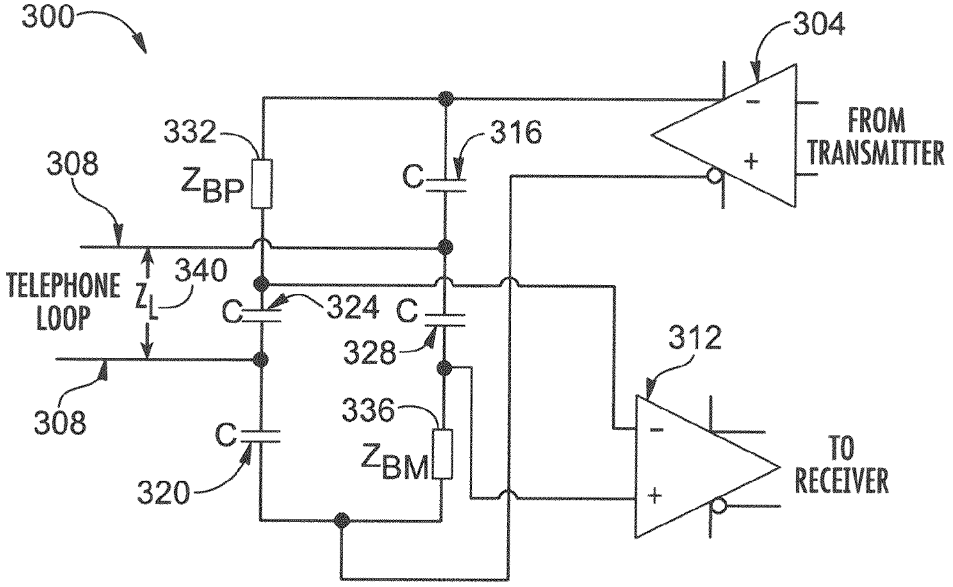
Figure 4:
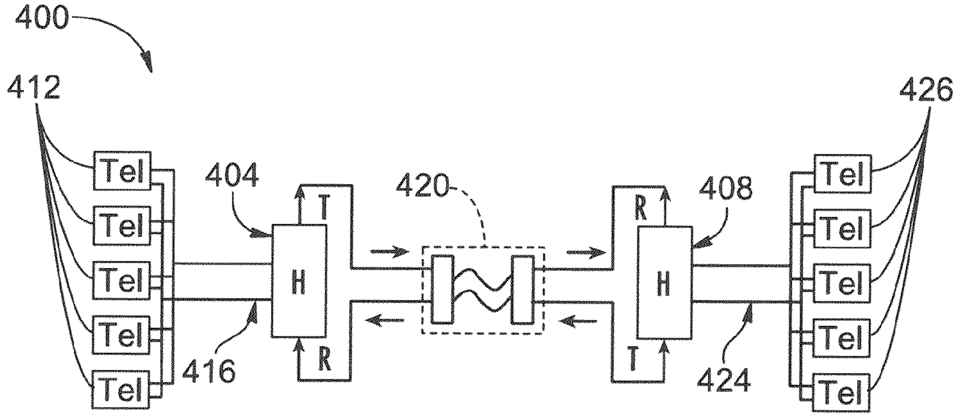

Referring to FIGS. 3 and 4, exemplary embodiments of the invention provide a differential transformer-free hybrid circuit for use in voice communications, and provide an exemplary communications system using the differential transformer-free hybrid circuit, and are described below.

FIG. 3 is a schematic diagram of an exemplary differential transformer-free hybrid circuit 300. In the exemplary embodiment, hybrid circuit 300 includes a first amplifier 304 configured for receiving a first signal (not shown) from a transmitter (not shown) and outputting the amplified first signal to a telephone loop 308. A second amplifier 312 is configured for receiving a second signal (not shown) from telephone loop 308 and outputting the amplified second signal to a receiver (not shown). In alternative embodiments, first amplifier 304 and second amplifier 312 are configurable to increase or decrease a level of first signal and second signal respectively. In the exemplary embodiment, first amplifier 304 and second amplifier 312 each include one or more differential operational amplifiers. In alternative embodiments, first amplifier 304 and/or second amplifier 312 include any suitable amplifier circuits known to those skilled in the art and guided by the teachings herein provided that are capable of performing the functions as described herein. In addition, in the exemplary embodiment hybrid circuit 300 includes a first current blocking device 316, a second current blocking device 320, a third current blocking device 324, and a fourth current blocking device 328.

The terms "transformer-free" and "transformer-less" are used interchangeable throughout the present disclosure. As used herein, "transformer-free" and "transformer-less" are defined as not using a transformer to couple hybrid circuit 300 to telephone loop 308, or to couple components of hybrid circuit 300 to telephone loop 308.

In the exemplary embodiment, first current blocking device 316, second current blocking device 320, third current blocking device 324, and fourth current blocking device 328 are blocking capacitors positioned to couple hybrid circuit 300 with a telephone loop 308 in place of a line transformer (not shown in FIG. 3). In alternative embodiments, first current blocking device 316, second current blocking device 320, third current blocking device 324, and fourth current blocking device 328 include any suitable component known to those skilled in the art and guided by the teachings herein provided that is capable of performing the functions as described herein.

In the exemplary embodiment, hybrid circuit 300 also includes a first balanced network element ($Z_{BP}$) 332 and a second balanced network element ($Z_{BM}$) 336. First balanced network element 332 has an impedance approximately equal to an impedance of second balanced network element 336, each with a value of approximately one-half of the value of a loop impedance ($Z_L$) 340 of telephone loop 308. In the exemplary embodiment, first balanced network element 332 and second balanced network element 336 each include one resistor. In alternative embodiments, first balanced network element 332 and/or second balanced network element 336 include a more complex balanced network as described further in FIGS. 5-6, which show other embodiments of first balanced network element 332 and/or second balanced network element 336.

Referring further to FIG. 3, during operation, first amplifier 304 receives a first signal from the transmitter. In the exemplary embodiment, first current blocking device 316 and second current blocking device 320 couple the amplified first signal output from first amplifier 304 to telephone loop 308. Additionally, in the exemplary embodiment, third current blocking device 324 and fourth current blocking device 328 couple the second signal from telephone loop 308 to second amplifier 312. In the exemplary embodiment, first current blocking device 316, second current blocking device 320, third current blocking device 324, and fourth current blocking device 328 are sized at one-microfarad. In various alternative embodiments, first current blocking device 316, second current blocking device 320, third current blocking device 324, and fourth current blocking device 328 are sized at any suitable value known to those skilled in the art and guided by the teachings herein provided and capable of performing the functions as described herein.

Hybrid circuit 300 is suitable for use in any type of communications system. By way of exemplary embodiment, such system may include a communications system, as shown in FIG. 4, for use in a life safety system, such as a fire alarm system in a commercial building or residential building. Such system enables a single telephone line to be used for the life safety system and for voice communications using a telephone in one or more alarm box on the building premises. The type of components and/or the values for the components of the balanced networks included in hybrid circuit 300 is determined to facilitate reducing or eliminating echo during a voice call. Options for balanced networks, as previously described above, are available and provide various benefits over the use of a single resistor including, without limitation, a more complex impedance path to more closely match a loop impedance 340 of telephone loop 308. As the impedance of the balanced network approaches loop impedance 340, the echo on voice calls using hybrid circuit 300 are diminished or eliminated.

When determining which components and/or values for the components to use for the balanced networks in hybrid circuit 300, in one embodiment loop impedance 340 is controlled to within a certain range to enable accurate modeling of hybrid circuit 300. If certain conditions are met, namely, restricting a length of telephone loop 308, limiting a number of telephones coupled to the system or limiting methods of coupling each telephone, and/or limiting a number of telephones that can be off-hook at any given time, loop impedance 340 can be modeled accurately. As a result, hybrid circuit 300 can be modeled accurately. In the exemplary embodiment, certain restrictions are applied to control loop impedance. Such conditions include, without limitation, a length of telephone loop 308 of about 10 feet to about 4,000 ft, there is no limit on the number of telephones attached but each phone must be attached using one relay module (not shown) per phone, and a maximum of six telephones may be active at any given time, one master/central phone and five remote telephones.

From transmission line theory, loop impedance ($Z_L$) 340 can be written as:

$$Z_L = \frac{Z_t A + B}{Z_t C + D}, \qquad \text{Eq. (1)}$$

where $Z_t$ is a far-end terminal impedance, and A, B, C, and D represent the four complex elements of frequency that characterize the electrical properties of a network of two hybrid circuits, one at each end of a single-gauge wire of a certain length. The ABCD matrix for a two-port network with one active master telephone and one active remote telephone connected by a single-gauge line can be expressed as follows:

$$[ABCD] = \begin{bmatrix} \cosh\gamma L & Z_c \sinh\gamma L \\ \frac{1}{Z_c}\sinh\gamma L & \cosh\gamma L \end{bmatrix}, \qquad \text{Eq. (2)}$$

where $\gamma$ is a line propagation constant and $Z_c$ is a characteristic impedance for a wire length of L units for a single-gauge wire. The line impedance when multiple telephones are off-hook requires a determination of the product of the ABCD matrices for each wire-length segment between the two hybrid circuits at each end of the complete wire-length, as determined by a location of each telephone "tap", and the line impedance of each telephone "tap".

Upon modeling loop impedance 340, the trans-hybrid loss (THL) of hybrid circuit 300 can be determined for multiple extremum points of $Z_L$ at frequencies between a band of 20 Hz to about 20 KHz or more specifically, between about 300 Hz and about 5 KHz, the spectral band of interest in the exemplary embodiment. Using the THL determinations at a lowest frequency and a highest frequency in the spectral band of interest, an optimized value for each component in first balanced network element 332 and second balanced network element 336 can be determined. In the exemplary embodiment, based on the above conditions applied to control loop impedance, the determined value of loop impedance 340 is 199.4 ohm, and both first balanced network element 332 and second balanced network element 336 are each a single resistor with a value of 98.7174 ohm. Resistors, capacitors, and inductors are not exact tolerant devices, thus although the exemplary embodiment calls for balanced network elements of a specific value, those with slightly different values do not have a detrimental effect on performance of the hybrid circuits. Similarly, these components may degrade over time, but because of how the values for the elements are determined, this degradation does not affect the results of the hybrid circuits overall. As such, although elements with a low tolerant variation are desired, larger tolerances no greater than 20% are acceptable.

FIG. 4 is a schematic diagram of an exemplary communications system 400 including a first differential transformer-free hybrid circuit 404 and a second differential transformer-free hybrid circuit 408. In the exemplary embodiment, at least one telephone device of a first telephone device bank 412 is coupled to a first telephone loop 416, and first telephone loop 416 is coupled to first differential transformer-free hybrid circuit 404 using a transformer-less interface (not shown). A second amplifier (not shown) in first differential transformer-free hybrid circuit 404 receives an audio signal (not shown) from first telephone device bank 412 through first telephone loop 416. Second amplifier amplifies a second signal and outputs the amplified second signal to a receiver input (not shown) of a communications transport 420. Communications transport 420 is configured such that any signal it receives at one end is communicatively coupled to an opposite end over an unknown distance and transmitted to a hybrid circuit at the opposite end. Second signal is transmitted by communications transport 420 to first amplifier (not shown) in second differential transformer-free hybrid circuit 408, coupled to a second telephone loop 424 using a transformer-less interface (not shown), and transmitted to at least one telephone device of a second telephone device bank 428. Similarly, the reverse occurs for voice signals originating from at least one telephone device of second telephone device bank 428 destined for at least one telephone device of first telephone device bank 412. In alternative embodiments, first telephone device bank 412 and second telephone device bank 428 may also include electronic devices for sending and/or receiving voice communications, such as, but not limited to, recording devices, radio patch systems, and electronic computing devices.

Figure 5:
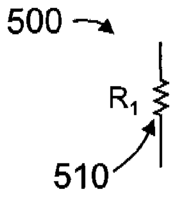
Figure 6:
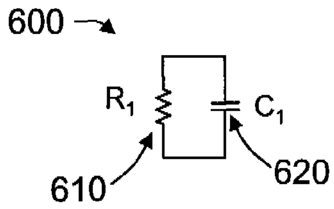
Figure 7:
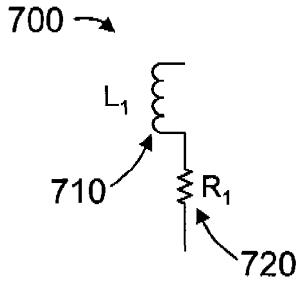
Figure 8:
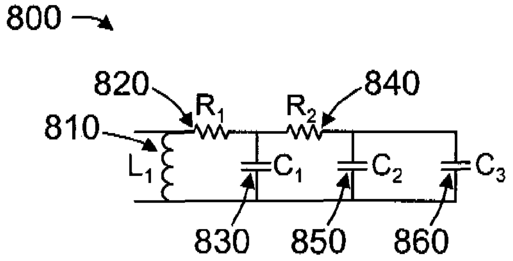
Figure 9:
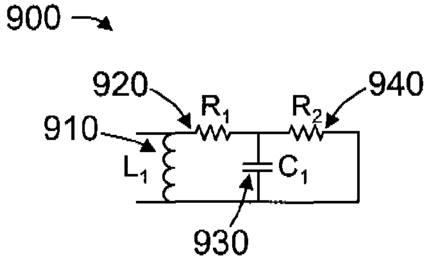

Shown in FIGS. 5-9 are various embodiments of balanced network elements that can be used for first balanced network element 332 (shown in FIG. 3) and second balanced network element 336 (shown in FIG. 3). Shown in FIG. 5 is the exemplary embodiment as described in FIG. 3, which includes a balanced network circuit 500 that includes a single resistor 510. Shown in FIG. 6 is a balanced network circuit 600 that includes a resistor 610 connected in parallel with a capacitor 620. Shown in FIG. 7 is a balanced network 700 that includes an inductor 710 connected in series with a resistor 720. Shown in FIG. 8 is a balanced network circuit 800 that includes an inductor 810 connected in parallel with a first resistor 820 connected in series with a first capacitor 830, wherein the first capacitor 830 is connected in parallel with a second resistor 840 connected in series with a second capacitor 850, and wherein the second capacitor 850 is connected in parallel with a third capacitor 860. Shown in FIG. 9 is a balanced network circuit 900 that includes an inductor 910 connected in parallel with a first resistor 920 connected in series with a first capacitor 930, wherein the first capacitor 930 is connected in parallel with a second resistor 940.

Figure 10:
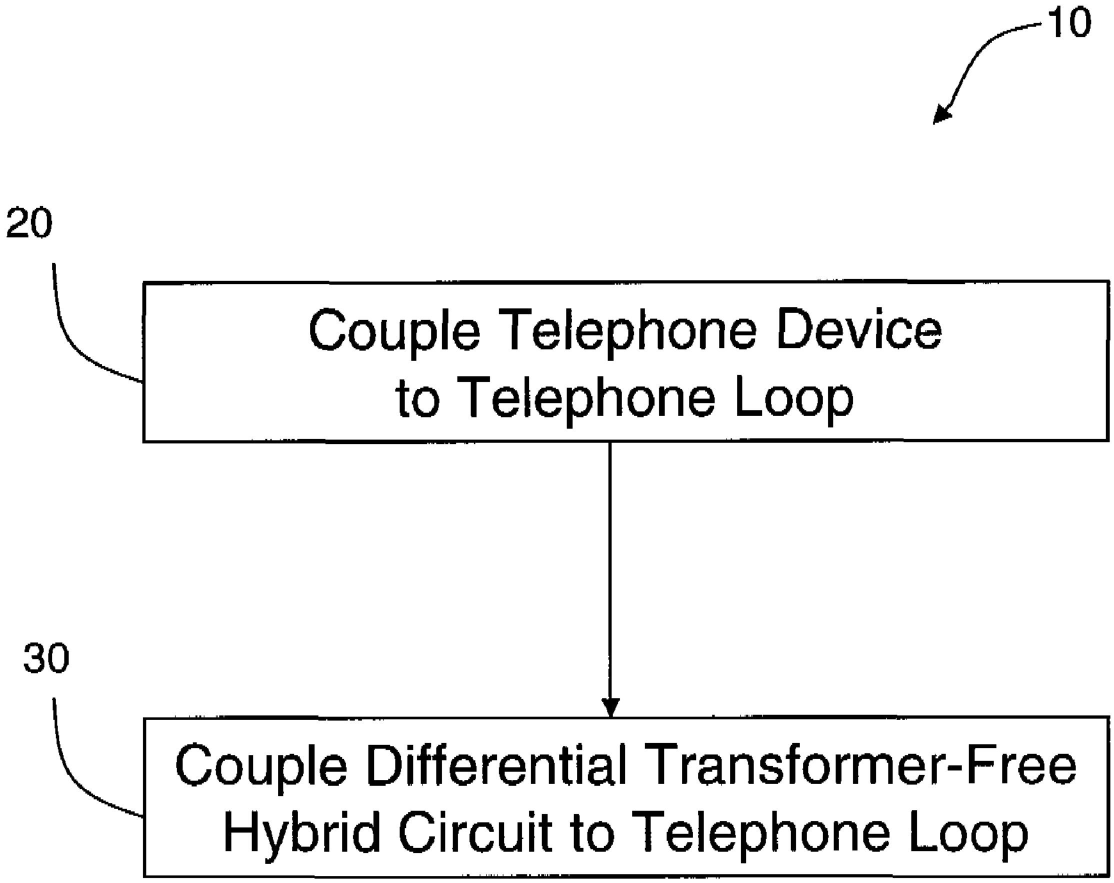

FIG. 10 is a flowchart of an exemplary method of facilitating communication over a telephone loop using a differential transformer-free hybrid circuit, such as is shown in FIG. 3. In the exemplary embodiment, the method includes coupling 20 at least one telephone device to a telephone loop. The method also includes coupling (30) the differential transformer-free hybrid circuit to the telephone loop. In an alternative embodiment, the method includes communicatively coupling the differential transformer-free hybrid circuit to a communications transport, wherein the communications transport is configured to transport communication signals between the hybrid circuit and an emergency responder.

Exemplary embodiments of a differential transformer-free hybrid circuit are described above in detail. The invention is not limited to the specific embodiments described herein. For example, the apparatus may also be used in hybrid circuits for higher than audible frequencies such as data transmission lines, and thus are not limited to practice with only the methods and systems as described herein. Rather, the exemplary embodiment can be implemented and utilized in connection with many other communication applications.

In the foregoing specification, it will be evident that various modifications and changes can be made thereto without departing from the broader spirit and scope of the invention. The specification and drawings are, accordingly, to be regarded in an illustrative rather than a restrictive sense.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A differential transformer-free hybrid circuit, comprising:

a first amplifier configured to receive a first signal from a transmitter and output the first signal to a telephone loop;

a second amplifier configured to receive a second signal from the telephone loop and output the second signal to a receiver;

two balanced network elements of approximately equal impedance, wherein the impedance of each of the said two balanced network elements is approximately equal to one-half of an impedance of the telephone loop; and a transformer-less interface configured to couple said first amplifier and said second amplifier to the telephone loop, said transformer-less interface comprising at least one current blocking device.

2. A differential transformer-free hybrid circuit in accordance with claim 1, wherein said at least one current blocking device couples said first amplifier to the telephone loop.

3. A differential transformer-free hybrid circuit in accordance with claim 1, wherein said at least one current blocking device couples said second amplifier to the telephone loop.

4. A differential transformer-free hybrid circuit in accordance with claim 1, wherein said differential transformer-free hybrid circuit is free of connections to ground.

5. A communications system, comprising:

at least one telephone device;

a telephone loop, said telephone loop coupled to said at least one telephone device;

a differential transformer-free hybrid circuit coupled to said telephone loop, said differential transformer-free hybrid circuit comprising:

a first amplifier configured to receive a first signal from a transmitter and output the first signal to said telephone loop;

a second amplifier configured to receive a second signal from said telephone loop and output the second signal to a receiver;

two balanced network elements of approximately equal impedance, wherein the impedance of each of the said two balanced network elements is approximately equal to one-half of an impedance of the telephone loop; and a transformer-less interface configured to couple said first amplifier and said second amplifier to said telephone loop, said transformer-less interface comprising at least one current blocking device.

6. A communications system in accordance with claim 5, wherein said at least one current blocking device couples said first amplifier to said telephone loop.

7. A communications system in accordance with claim 5, wherein said at least one current blocking device couples said second amplifier to said telephone loop.

8. A communications system in accordance with claim 5, wherein said differential transformer-free hybrid circuit is free of connections to ground.

9. A communications system in accordance with claim 5, wherein the transmitter and the receiver are communicatively coupled to a communications transport wherein said communications transport is configured to transmit the second signal to an emergency responder and receive the first signal from said emergency responder.

10. A method of facilitating communication over a telephone loop, said method comprising:

coupling at least one telephone device to a telephone loop; and coupling a differential transformer-free hybrid circuit to the telephone loop, the differential transformer-free, hybrid circuit comprising:

a first amplifier configured to receive a first signal from a transmitter and output the first signal to the telephone loop;

a second amplifier configured to receive a second signal from the telephone loop and output the second signal to a receiver;

two balanced network elements of approximately equal impedance, wherein the impedance of each of the said two balanced network elements is approximately equal to one-half of an impedance of the telephone loop; and a transformer-less interface configured to couple the first amplifier and the second amplifier to the telephone loop, the transformer-less interface comprising at least one current blocking device.

11. A method in accordance with claim 10, wherein coupling a differential transformer-free hybrid circuit to the telephone loop comprises coupling the first amplifier to the telephone loop using the at least one current blocking device.

12. A method in accordance with claim 10, wherein coupling a differential transformer-free hybrid circuit to the telephone loop, further comprises coupling the second amplifier to the telephone loop.

13. A method in accordance with claim 10, further comprising coupling a differential transformer-free hybrid circuit to the telephone loop, wherein the differential transformer-free hybrid circuit is free of connections to ground.

14. A method in accordance with claim 10, further comprising communicatively coupling the first amplifier and the second amplifier to a communications transport, wherein the communications transport is configured to transport the second signal to an emergency responder and receive the first signal from the emergency responder.

* * * * *